United States Patent [19]
Miura et al.

[11] Patent Number: 4,743,646
[45] Date of Patent: May 10, 1988

[54] THERMOPLASTIC RESIN COMPOSITION

[75] Inventors: Tetsuji Miura; Koichi Sato; Norio Yagi, all of Machida, Japan

[73] Assignee: Denki Kagaku Kogyo Kabushiki Kaisha, Tokyo, Japan

[21] Appl. No.: 838,819

[22] Filed: Mar. 12, 1986

[51] Int. Cl.$^4$ .......................... C08K 3/04; C08K 3/40; C08L 51/00; C08L 51/08
[52] U.S. Cl. .................................... 524/504; 524/494; 524/496; 525/63
[58] Field of Search ........................ 524/494, 496, 504; 525/63

[56] References Cited

U.S. PATENT DOCUMENTS

| | | | |
|---|---|---|---|
| 3,632,791 | 1/1972 | Rupprecht et al. | 524/548 |
| 3,652,726 | 3/1972 | Nield et al. | 524/504 |
| 4,381,373 | 4/1983 | Ikuma | 525/194 |
| 4,404,322 | 9/1983 | Saito et al. | 525/73 |
| 4,487,881 | 12/1984 | Rawlings et al. | 524/504 |
| 4,504,625 | 3/1985 | Kitsunai et al. | 525/71 |
| 4,543,392 | 9/1985 | Kasahara et al. | 525/90 |
| 4,585,824 | 4/1986 | Uchida et al. | 524/504 |
| 4,608,414 | 8/1986 | Kitsunai et al. | 525/71 |

FOREIGN PATENT DOCUMENTS

| | | | |
|---|---|---|---|
| 0065756 | 5/1979 | Japan | 524/504 |
| 57-57719 | 4/1982 | Japan . | |
| 57-98536 | 6/1982 | Japan . | |
| 57-141426 | 9/1982 | Japan . | |
| 58-71952 | 4/1983 | Japan . | |
| 58-101141 | 6/1983 | Japan . | |
| 58-183729 | 10/1983 | Japan . | |
| 59-27943 | 2/1984 | Japan . | |
| 59-33348 | 2/1984 | Japan . | |
| 0187046 | 10/1984 | Japan | 524/504 |
| 0219352 | 12/1984 | Japan | 524/504 |
| 0053550 | 3/1985 | Japan | 524/504 |
| 0214597 | 10/1985 | Japan | 524/504 |
| 61-9452 | 1/1986 | Japan . | |

OTHER PUBLICATIONS

Derwent Abs. 85-102053/17 Denki Kagaku Kogyo KK J60047045 (Mar. 14, 1985).
Derwent Abs. 85-102057/17 Denki Kagaku Kogyo KK J60047049 (Mar. 14, 1985).
Derwent Abs. 83-714228/29 Daicel Chem. Ind. J58098353.

Primary Examiner—Herbert J. Lilling
Attorney, Agent, or Firm—Oblon, Fisher, Spivak, McClelland & Maier

[57] ABSTRACT

A thermoplastic resin composition comprising (I) from 40 to 98 parts by weight of a thermoplastic resin comprising (A) from 10 to 90% by weight of an imidemodified copolymer obtained by reacting a composition consisting of a polymer and a primary aromatic amine to a polymer prepared by copolymerizing (a) a monomer mixture comprising an aromatic vinyl monomer, an unsaturated dicarboxylic acid anhydride and a vinyl monomer copolymerizable therewith, to (b) a rubber polymer component, to convert from 80 to 100 mol % of acid anhydride groups in the polymer to imido groups; (B) from 10 to 90% by weight of a graft copolymer prepared by copolymerizing (a) a monomer mixture comprising an aromatic vinyl monomer, a vinyl cyanide monomer and a vinyl monomer copolymerizable therewith, to (b) a rubber polymer component; and (C) from 0 to 80% by weight of a copolymer prepared by polymerizing an aromatic vinyl monomer, a vinyl cyanide monomer and a vinyl monomer copolymerizable therewith; and, (II) from 2 to 60 parts by weight of at least one fiber selected from the group consisting of glass fiber, carbon fiber and aramide fiber.

8 Claims, No Drawings

THERMOPLASTIC RESIN COMPOSITION

BACKGROUND OF THE INVENTION

1. Field of the Invention

The present invention relates to a thermoplastic resin composition, particularly a thermoplastic resin composition reinforced by fiber material and containing an imide-modified copolymer. More particularly, it relates to a thermoplastic resin composition obtained by reinforcing a thermoplastic resin comprising, as an essential component, a mixture of a rubber-modified aromatic vinyl copolymer and an imide-modified copolymer obtained by reacting ammonia and/or a primary amine to a copolymer obtained by polymerizing a monomer mixture comprising an aromatic vinyl monomer and an unsaturated dicarboxylic acid anhydride, if necessary, in the presence of a rubber-like polymer, with fiber material selected from the group consisting of glass fiber, carbon fiber and aramide fiber.

2. Description of the Prior Art

Heretofore, there has been known a composition comprising glass fiber and a copolymer composed essentially of an aromatic vinyl monomer, an unsaturated dicarboxylic acid anhydride and other vinyl monomers (Japanese Unexamined patent publication No. 88189/1973). Such a composition comprising glass fiber and a copolymer obtained by the copolymerization of an unsaturated dicarboxylic acid anhydride, contains acid anhydride groups in the copolymer chain, which derived from the unsaturated dicarboxylic acid anhydride. Thus, such a composition is likely to undergo chemical changes and decomposition not only when contacted to water at a high temperature but also when subjected to heat. Therefore, its injection or extrusion molding is very much restricted, and when a product made thereof is contacted with water or steam, or exposed to a high temperature, the mechanical properties, particularly the impact strength, are likely to deteriorate.

U.S. Pat. No. 3,632,791 discloses a composition comprising glass fiber and a copolymer composed of from 40 to 95% by weight of an aromatic vinyl monomer, from 5 to 25% by weight of a maleimide and from 0 to 35% by weight of other monomers. However, in such a composition, the maleimide content is low, and the affinity of the copolymer to the glass fiber surface is inadequate. Further, the impact strength is inadequate since there is no substance serving to increase the impact strength such as a rubber-modified copolymer.

SUMMARY OF THE INVENTION

The present invention has been accomplished as a result of extensive researches to overcome the above-mentioned drawbacks not only in the case where glass fiber is used but also in the case where carbon fiber and/or aramide fiber is employed, and it is based on a discovery that a thermoplastic resin composition having high rigidity and excellent heat resistance, impact resistance and hot water resistance, can be obtained by mixing at least one fiber selected from the group consisting of glass fiber, carbon fiber and aramide fiber to a thermplastic resin comprising, as an essential component, a mixture of a rubber-modified aromatic vinyl copolymer and an imide-modified copolymer obtained by reacting ammonia and/or a primary amine to a copolymer obtained by polymerizing a monomer mixture comprising an aromatic vinyl monomer and an unsaturated dicarboxylic acid anhydride, if necessary, in the presence of a rubber-like polymer.

Namely, the present invention provides a thermoplastic resin composition comprising:

(I) from 40 to 98 parts by weight of a thermoplastic resin comprising:

(A) from 10 to 90% by weight of an imide-modified copolymer obtained by reacting ammonia and/or a primary amine to a polymer prepared by copolymerizing (a) from 60 to 100% by weight of a monomer mixture comprising from 40 to 80% by weight of an aromatic vinyl monomer, from 25 to 50% by weight of an unsaturated dicarboxylic acid anhydride and from 0 to 30% by weight of a vinyl monomer copolymerizable therewith, to (b) from 0 to 40% by weight of a rubber-like polymer, to convert from 80 to 100 mol % of acid anhydride groups in the polymer to imido groups;

(B) from 10 to 90% by weight of a graft copolymer prepared by copolymerizing (a) from 20 to 95% by weight of a monomer mixture comprising from 40 to 80% by weight of an aromatic vinyl monomer, from 0 to 40% by weight of a vinyl cyanide monomer and from 0 to 40% by weight of a vinyl monomer copolymerizable therewith, to (b) from 5 to 80% by weight of a rubber-like polymer; and (C) from 0 to 80% by weight of a copolymer prepared by polymerizing from 40 to 80% by weight of an aromatic vinyl monomer, from 0 to 40% by weight of a vinyl cyanide monomer and from 0 to 40% by weight of a vinyl monomer copolymerizable therewith; and, (II) from 2 to 60 parts by weight of at least one fiber selected from the group consisting of glass fiber, carbon fiber and aramide fiber.

DETAILED DESCRIPTION OF THE PREFERRED EMBODIMENTS

The composition of the present invention is useful for various applications where the above-mentioned properties are required. For instance, it is useful for the interior or exterior of automobiles, internal parts of engine rooms, electric and electronic appliances or industrial machine parts, or for kitchen utensils which are likely to be subjected to hot water.

The thermoplastic resin of the present invention may be composed solely of components A and B. However, not more than 80% by weight of an aromatic vinyl copolymer may be incorporated as component C thereto, without impairing the excellent properties of the thermoplastic resin composition of the present invention. This brings about an advantage that an inexpensive aromatic vinyl copolymer can thereby be blended in a large amount.

First, the polymer of component A and the process for its preparation will be described.

The monomer mixture to be used, comprises from 40 to 80% by weight of an aromatic vinyl monomer, from 25 to 50% by weight of an unsaturated dicarboxylic acid anhydride and from 0 to 30% by weight of a vinyl monomer copolymerizable therewith. If necessary, a rubber-like polymer may be employed in an amount of not higher than 40% by weight relative to the monomer mixture. If the content of the aromatic vinyl monomer in the monomer mixture is less than 40% by weight, the characteristics of the aromatic vinyl compound such as the moldability and dimensional stability tend to be impaired. On the other hand, if the unsaturated dicarboxylic acid anhydride is less than 25% by weight, the affinity with glass fiber, carbon fiber and aramide fiber will be inadequate, and the heat resistance tends to be poor. On the other hand, if the unsaturated dicarboxylic acid anhydride exceeds 50% by weight, the copolymer composition tends to be brittle, and the moldability will also be poor.

The aromatic vinyl monomer constituting component A includes a styrene monomer such as styrene, α-methylstyrene, vinyltoluene, t-butylstyrene or chlorostyrene, and its substituted monomers. Among them, styrene is particularly preferred.

The unsaturated dicarboxylic acid anhydride includes anhydrides of maleic acid, itaconic acid, citraconic acid and aconitic acid. Maleic anhydride is particularly preferred.

The vinyl monomer copolymerizable therewith includes a vinyl cyanide monomer such as acrylonitrile, methacrylonitrile or α-acrylonitrile, an acrylate monomer such as methyl acrylate or ethyl acrylate, a methacrylate monomer such as methyl methacrylate or ethyl methacrylate, a vinyl carboxylic acid monomer such as acrylic acid or methacrylic acid, acrylic acid amide and methacrylic acid amide. Among these monomers, acrylonitrile, a methacrylate, acrylic acid and methacrylic acid are preferred.

As the rubber-like polymer, there may be employed a butadiene polymer, a copolymer of butadiene with a copolymerizable vinyl monomer, an ethylene-propylene copolymer, an ethylene-propylene-diene copolymer, a block copolymer of butadiene with an aromatic vinyl monomer, an acrylate polymer or a copolymer of an acrylate with a copolymerizable vinyl monomer. If the rubber component in component A exceeds 40% by weight, the heat resistance and moldability tend to be inferior.

The ammonia or primary amine to be used for the imide-modification reaction may be anhydrous or in the form an aqueous solution. The primary amine includes, e.g. an alkyl amine such as methylamine, ethylamine, butylamine or cyclohexylamine and such an alkyl amine substituted by chlorine or bromine, an aromatic amine such as aniline, tolyl amine or naphthyl amine, and a halogen-substituted aromatic amine such as chloro- or bromo-substituted aniline.

When the imide-modification reaction is conducted in a state of a solution or suspension, it is preferred to employ a usual reactor such as autoclave. When the reaction is conducted in a state of a molten mass, an extruder equipped with a deaerator may be employed.

For the imide-modification reaction, a catalyst may be employed. As such a catalyst, a tertiary amine such as triethylamine is preferbly employed.

The imide-modification reaction is usually conducted at a temperature of from about 80° to about 350° C. preferably from 100° to 300° C. If the temperature is lower than 80° C., the raction is slow, and it requires a long period of time, such being not practical. On the other hand, if the temperature exceeds 350° C., the polymer tends to undergo thermal decomposition, whereby the physical properties will be deteriorated.

The amount of the ammonia and/or the primary amine is preferably from 0.8 to 1.05 mols per mol of the unsaturated dicarboxylic acid anhydride. If the amount of less than 0.8 mol, the content of acid anhydride groups in the resulting imide-modified copolymer will be too much, whereby the thermal stability and hot water resistance tend to be impaired.

Now, component B and the process for its preparation will be described.

The rubber-like polymer to be used for component B includes a polymer of butadiene alone or butadiene with a copolymerizable vinyl monomer, an ethylene-propylene copolymer, an ethylene-propylene-diene copolymer and a polymer of an acrylate alone or an acrylate with a copolymerizable vinyl monomer.

The aromatic vinyl monomer to be used for component B includes a styrene monomer such as styrene, α-methylstyrene, vinyltoluene, t-butylstyrene or chlorostyrene and its substituted monomers. Among these monomers, styrene and α-methylstyrene are particularly preferred.

The vinyl cyanide monomer includes acrylonitrile, methacrylonitrile and α-chloroacrylonitrile. Acrylonitrile is particularly preferred.

As the vinyl monomer copolymerizable therewith, there may be mentioned an acrylate monomer such as methyl acrylate, ethyl acrylate or butyl acrylate, a methacrylate monomer such as methyl methacrylate or ethyl methacrylate, a vinyl carboxylic acid monomer such as acrylic acid or methacrylic acid, acrylic acid amide, and methacrylic acid amide. Among these monomers, methyl methacrylate, acrylic acid and methacrylic acid are particularly preferred.

The graft copolymer of component B is prepared by graft copolymerizing from 20 to 95% by weight of a monomer mixture comprising from 40 to 80% by weight of the aromatic vinyl monomer, from 0 to 40% by weight of the vinyl cyanide monomer and from 0 to 40% by weight of the vinyl monomer copolymerizable therewith, in the presence of from 5 to 80% by weight of the rubber-like polymer. For the polymerization, any conventional polymerization technique may be employed. For instance, there may be mentioned an aqueous heterogeneous polymerization such as suspension polymerization or emulsion polymerization, bulk polymerization, a solution polymerization and precipitation polymerization in a non-solvent for the resulting polymer.

Now, component C and the process for its preparation will be described.

The aromatic vinyl monomer to be used for component C includes a styrene monomer such as styrene, α-methylstyrene, vinyltoluene, t-butylstyrene or chlorostyrene, and its substituted monomers. Among them, styrene and α-methylstyrene are particularly preferred.

The vinyl cyanide monomer includes acrylonitrile, methacrylonitrile and α-chloroacrylonitrile. Acrylonitrile is particularly preferred.

As the vinyl monomer copolymerization therewith, there may be mentioned an acrylate monomer such as methyl acrylate, ethyl acrylate or butyl acrylate, a methacrylate monomer such as methyl methacrylate or ethyl methacrylate, a vinyl carboxylic acid monomer such as acrylic acid or methacrylic acid, acrylic acid amide, methacrylic acid amide, acenaphthylene, N-vinylcarbazole, an N-alkyl-substituted maleimide, and an N-aromatic-substituted maleimide.

In the resin composition of the present invention, the content of at least one fiber selected form the group consisting of glass fiber, carbon fiber and aramide fiber is from 2 to 60% by weight, preferably from 5 to 40% by weight. If the content of the fiber is less than 2% by weight, no adequate improvement in the rigidity and dimensional stability of the resulting molded product will be obtained. On the other hand, if the content exceeds 60% by weight, the molding, particularly the injection molding, will be very difficult.

The aramide fiber is fiber of a polyamide having aromatic groups introduced in its molecular chain. As such a polymer, there may be mentioned a poly-m-xylyleneadipamide, a poly-p-benzamide, a poly-p-phenylene terephthalamide and a poly-m-phenyleneisophthalamide.

The physical properties of the fiber composition varies to a large extent depending upon the shape and the surface treatment condition of the fiber as in the case of various conventional fiber-reinforced compositions. In the fiber-reinforced composition of the present invention, the length of the fiber is preferably at least 0.3 mm, and a silane coupling agent such as amino silane or epoxy silane or a titanium coupling agent may be employed.

The composition of the present invention is prepared by mixing a thermoplastic resin comprising, as an essential component, a mixture of the imide-modified copolymer and the rubber-modified aromatic vinyl copolymer, with at least one fiber selected from the group consisting of glass fiber, carbon fiber and aramide fiber. There is no particular restriction as to the manner of mixing. Namely, the mixing can be conducted by means of a conventional means such as a Bumbury's mixer, a tumbling mixer, a mixing roll or a single screw of double screw extruder. As the mixing mode, there may be employed a conventional melt mixing, a stepwise melt kneading wherein master pellets are used or a blending in a solution to obtain the composition.

Further, it is also possible to incorporate into the composition of the present invention a stabilizer, a flame-retardant, a plasticizer, a lubricant, an ultraviolet absorber, a coloring agent, and a filler such as talc, silica, clay, mica or calcium carbonate.

Now, the present invention will be described in further detail with reference to Examples. However, it should be understood that the present invention is by no means restricted by these specific Examples. In the Examples, "parts" and "%" mean "parts by weight" and "% by weight".

EXPERIMENT (1): Preparation of Component A

Into an autoclave equipped with a stirrer, 60 parts of styrene and 50 parts of methyl ethyl ketone were fed. After flushing the inside of the autoclave with nitrogen gas, the temperature was raised to 85° C., and a solution prepared by dissolving 40 parts of maleic anhydride and 0.15 part of benzoyl peroxide in 250 parts of methyl ethyl ketone, was continuously added over a period of 8 hours. After the addition, the reaction system was kept at 85° C. for further 3 hours. A part of the viscous reaction solution was sampled and subjected to a quantitative analysis of unreacted monomers by gas chromatography, whereupon the degree of polymerization was found to be 98% for styrene and 98% for maleic anhydride. To the copolymer solution thus obtained, 36.1 parts of aniline equivalent to 0.95 mol per mol of the maleic anhydride, and 0.3 part of triethylamine were added, and reacted at 140° C. for 7 hours. To the reaction solution, 200 parts of methyl ethyl ketone was added, and the mixture was cooled to room temperature and poured into 1500 parts of vigorously agitated methanol, whereupon the precipitated product was filtered and dried to obtain an imide-modified polymer. From the C-13 NMR analysis, it was found that in the reaction for conversion of the acid anhydride groups to imide groups, aniline was reacted almost 100%. This was designated as polymer A.

EXPERIMENT (2): Preparation of Component A

Into the same autoclave as used in Experiment (1), 60 parts of styrene, 100 parts of methyl ethyl ketone and 10 parts of polybutadiene cut into small fragments, were fed, and stirred at room temperature for 1 day to dissolve the rubber. Then, after flushing the inside of the autoclave with nitrogen gas, the temperature was raised to 85° C. A solution obtained by dissolving 40 parts of maleic anhydride and 0.15 part of azobisisobutyronitrile in 200 parts of methyl ethyl ketone, was continuously added over a period of 8 hours. Thereafter, the operation was conducted in the same manner as in Experiment (1). The degree of polymerization was 98% for styrene and 99% for maleic anhydride. In the reaction for conversion of the acid anhydride groups to imide groups, the reaction of aniline was almost 100% as in the case of Experiment (1). This was designated as polymer B.

EXPERIMENT (3): Preparation of Component A

The operation was conducted in the same manner as in

Experiment (1) except that into the same autoclave as used in Experiment (1), 60 parts of styrene, 10 parts of acrylonitrile and 50 parts of methyl ethyl ketone were fed, a solution prepared by dissolving 30 parts of maleic anhydride and 0.15 part of azobisisobutyronitrile in 250 parts of methyl ethyl ketone, was continuously added over a period of 9 hours, and aniline was used in an amount of 27.0 parts. The degree of polymerization was 99% for styrene, 92% for acrylonitrile and 96% for maleic anhydride. The reaction of aniline was almost 100% as in the case of Experiment (1). This was designated as polymer C.

EXPERIMENT (4): Preparation of Component B 143 parts of a polybutadiene latex (solid content: 35%, weight average particle size: 0.35 μm, gel content: 90%), 1 part of potassium stearate, 0.1 part of sodium formaldehyde sulfoxylate, 0.03 part of tetrasodium ethylene diamine tetraacetic acid, 0.003 part of ferrous sulfate and 150 parts of water, were heated to 50° C. To this mixture, 50 parts of a monomer mixture comprising 70% of styrene and 30% of acrylonitrile, 0.2 part of t-dodecylmercaptan and 0.15 part of cumene hydroperoxide, were continuously added over a period of 6 hours. After the addition, the temperature was raised to 65° C., and the polymerization was continued for 2 hours. The degree of polymerization reached 97% as determined by gas chromatography analysis. After an addition of an antioxidant, the latex thus obtained was solidified with calcium chloride, washed with water and dried to obtain a graft copolymer as white powder. This was designated as polymer D.

EXPERIMENT (5): Preparation of Component C 60 parts of α-methylstyrene, 10 parts of styrene, 30 parts of acrylonitrile, 2.5 parts of potassium stearate, 0.5 part of t-dodecylmercaptan and 250 parts of water, were heated to 70° C. To this mixture, 0.05 part of potassium persulfate was added to initiate the polymerization. Upon expiration of 7 hours from the initiation of the polymerization, 0.03 part of potassium persulfate was further added, and the temperature was raised to 75° C. and maintained at that temperature for 3 hours to complete the polymerization. The degree of polymerization reached 97%. The latex thus obtained was solidified with calcium chloride, washed with water and dried to obtain a copolymer as white powder. This was designated as polymer E.

EXAMPLES 1 to 7

Polymers A to E obtained in Experiments (1) to (5) were mixed with glass fiber having a length of 5 mm, PAN-type carbon fiber having a length of 6 mm and aramide fiber having a length of 6 mm (Kebular K-49, manufactured by DuPont) in the proportions as identified in Table 1 in a Henschel mixer. Each mixture was extruded by an extruder equipped with a deaerator to obtain pellets. The pellets were molded by an injection molding machine, and the physical properties were measured. The results are shown in Table 1. To each composition, 2 parts of tristearyl phosphite and 0.5 part of octadecyl 3-(3,5-ditertiarybutyl-4-hydroxyphenyl)-propionate, relative to 100 parts of the polymer, were added.

COMPARATIVE EXAMPLE 1

The operation was conducted in the same manner as in Experiment (1) except that into the same autoclave as used in Experiment (1), 90 parts of styrene and 150 parts of methyl ethyl ketone were fed, a solution prepared by dissolving 10 parts of maleic anhydride and 0.15 part of azobisisobutyronitrile in 100 parts of methyl ethyl ketone, was continuously added over a period of 10 hours, and aniline was used in an amount of 9.49 parts. The degree of polymerization was 95% for styrene, and 99% for maleic anhydride. The reaction of aniline was almost 100% as in the case of Experiment (1). This was designated as polymer P. Glass fiber having a length of 5 mm was added thereto in the proportion as shown in Table 1, and mixed in the same manner as in Example 1. The mixture was molded, and the physical properties were measured in the same manner as in Example 1. The results are shown in Table 1.

What is claimed is:

1. A thermoplastic resin composition comprising:
   (I) from 40 to 98 parts by weight of a thermoplastic resin comprising:
      (A) from 10 to 90% by weight of an imide-modified copolymer obtained by reacting a composition consisting of a polymer and a primary aromatic amine said polymer prepared by copolymerizing (a) from 60 to 100% by weight of a monomer mixture comprising from 40 to 80% by weight of an aromatic vinyl monomer, from 25 to 50% by weight of an unsaturated dicarboxylic acid anhydride and from 0 to 30% by weight of a vinyl monomer copolymerizable therewith, to (b) from 0 to 40% by weight of a rubber polyer component, to convert from 80 to 100 mol % of acid anhydride group in the polymer to imido groups;
      (B) from 10 to 90% by weight of a graft copolymer prepared by copolymerizing (a) from 20 to 95% by weight of a monomer mixture comprising from 40 to 80% by weight of an aromatic vinyl monomer, from 0 to 40% by weight of a vinyl cyanide monomer and from 0 to 40% by weight of a vinyl monomer copolymerizable therewith, to (b) from 5 to 80% by weight of a rubber polymer component; and
      (C) from 0 to 80% by eight of a copolymer prepared by polymerizing from 40 to 80% by weight of an aromatic vinyl monomer, from 0 to 40% by weight of a vinyl cyanide monomer and from 0 to 40% by weight of a vinyl monomer copolymerizable therewith; and,
   (II) from 2 to 60 parts by weight of at least one fiber selected from the group consisting of glass fiber, carbon fiber and aramide fiber.

2. The thermoplastic resin composition according to claim 1, wherein the rubber polymer component in each of components A and B is selected from the group consisting of a polybutadiene, a styrene-butadiene copoly-

TABLE 1

| | Composition | | Physical properties | | |
|---|---|---|---|---|---|
| | Polymer (parts) | Fiber (parts) | Tensile strength (kg/cm$^2$) | Impact strength (kg . cm/cm) | Vicat softening point (°C.) |
| Example 1 | Polymer A (50), Polymer D (20) | Glass fiber (30) | 1520 | 10 | 170 |
| Example 2 | Polymer B (50), Polymer D (20) | Glass fiber (30) | 1470 | 11 | 167 |
| Example 3 | Polymer C (50), Polymer D (20) | Glass fiber (30) | 1550 | 11 | 162 |
| Example 4 | Polymer A (20), Polymer D (15) Polymer E (25) | Glass fiber (40) | 1640 | 10 | 160 |
| Example 5 | Polymer B (70), Polymer D (20) | Aramide fiber (10) | 1430 | 13 | 166 |
| Example 6 | Polymer C (55), Polymer D (25) | Aramide fiber (20) | 1570 | 13 | 168 |
| Example 7 | Polymer A (50), Polymer D (20) | Carbon fiber (30) | 1500 | 12 | 167 |
| Comparative Example | Polymer P (70) | Glass fiber (30) | 920 | 5 | 125 |

It is evident from Table 1 that the compositions of the present invention have high rigidity and exhibit remarkable improvements in the impact resistance and heat resistance.

The physical properties were measured in accordance with the following methods.

(1) Tensile strength: Measured in accordance with ASTM-D 651.

(2) Impact strength: Notched Izod strength, measured in accordance with ASTM-D 256.

(3) Vicat softening point: Load 5 kg, measured in accordance with ASTM-D 1525.

mer, an acrylonitrile-butadiene copolymer and butadiene-methyl methacrylate copolymer.

3. The thermoplastic resin composition according to claim 1, wherein the aromatic vinyl monomer in each of components A, B and C is selected from the group consisting of styrene, α-methylstyrene, vinyltoluene, t-butylstyrene and chlorostyrene.

4. The thermoplastic resin composition according to claim 1, wherein the unsaturated dicarboxylic acid anhydride in component A is selected from anhydrides of maleic acid, itaconic acid citraconic acid and aconitic acid.

5. The thermoplastic resin composition according to claim 1, wherein the copolymerizable vinyl monomer in each of components A, B and C is selected from the group consisting of acrylonitrile, a methacrylate, acrylic acid and methacrylic acid.

6. The thermoplastic resin composition according to claim 1, wherein the vinyl cyanide monomer in each of components B and C is selected from the group consisting of acrylonitrile and methacrylonitrile.

7. The thermoplastic resin composition according to claim 1, wherein the aromatic amine is selected from the group consisting of aniline, tolylamine, naphthylamine and bromoaniline.

8. The thermoplastic resin composition according to claim 1, wherein the aromatic amine is aniline.

* * * * *